(12) United States Patent
Wada

(10) Patent No.: US 6,478,430 B2
(45) Date of Patent: *Nov. 12, 2002

(54) ILLUMINATION APPARATUS AND PROJECTION APPARATUS

(75) Inventor: Ken Wada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,065

(22) Filed: Dec. 21, 1999

(65) Prior Publication Data

US 2002/0131021 A1 Sep. 19, 2002

(30) Foreign Application Priority Data

Dec. 24, 1998 (JP) .......................................... 10-376549

(51) Int. Cl.⁷ .......................... G03B 21/00; G03B 21/26
(52) U.S. Cl. .............................. 353/31; 353/30; 353/33
(58) Field of Search .............................. 353/30, 31, 33, 353/34, 37, 81, 82, 100, 101, 98, 99, 102, 69, 122; 359/40, 83

(56) References Cited

U.S. PATENT DOCUMENTS

| 5,179,398 A | * | 1/1993 | Iizuka | 353/30 |
| 5,634,704 A | * | 6/1997 | Shikama et al. | 353/31 |
| 5,911,489 A | * | 6/1999 | Watanabe | 353/98 |
| 6,120,152 A | * | 9/2000 | Nakayama et al. | 353/31 |
| 6,186,629 B1 | * | 2/2001 | Iwamura et al. | 355/31 |

* cited by examiner

*Primary Examiner*—Russell Adams
*Assistant Examiner*—Roy Fuller
(74) *Attorney, Agent, or Firm*—Morgan & Finnegan, LLP

(57) ABSTRACT

An illumination apparatus illuminates a surface to be illuminated, by use of a light source, a secondary light source forming system for forming a plurality of secondary light sources from light emitted from the light source, and a lens system for forming a conjugate plane conjugate with a light entrance plane or a vicinity thereof of the secondary light source forming system after a color separation system for separating light from the secondary light source forming system into three beams of mutually different wavelength regions. A relay lens system is placed in a predetermined optical path out of three optical paths of the three beams color-separated. The surface to be illuminated does not agree with a paraxial image plane of the conjugate plane formed by the relay lens system.

39 Claims, 11 Drawing Sheets

ILLUMINATION APPARATUS AND PROJECTION APPARATUS

BACKGROUND OF THE INVENTION

1. Field of the Invention

The present invention relates to an illumination apparatus and a projection apparatus having it and, more particularly, to the illumination apparatus that is compact and that can implement highly uniform illumination, which is suitably applicable, for example, to color liquid-crystal projectors of a three panel type.

2. Related Background Art

In recent years, the illumination apparatus in the field of liquid-crystal projectors employs an illumination system using a fly's eye lens or a rod type integrator in the optical path in order to realize high luminance and enhance uniformity of screen illuminance, and one of such apparatus is proposed, for example, in Japanese Patent Application Laid-Open No. 7-98479.

FIG. 10 is a sectional view of the major part of the illumination system in a conventional, color liquid-crystal projector of the three panel type. In FIG. 10, DM1 designates a red-transmitting dichroic mirror. DM2 denotes a blue-transmitting dichroic mirror. G1, G2, and G3 represent lenses, these three lenses composing a blue-path relay lens group 76B. RLCD indicates a liquid crystal display device for red only, GLCD that for green only, and BLCD that for blue only.

Rays from a light source 71 are reflected by a reflector 72 to be outgoing from the reflector 72 in the form of parallel rays. Then the rays are incident to a first lens array 73 to be separated into a plurality of beams by the first lens array 73. The plurality of beams form a plurality of secondary light source images (which are images of the light source 71) on a second lens array 74. Light from each secondary light source image formed on the second lens array 74 is guided through a PBS element 75 to be subjected to polarization conversion. After that, the light travels via a condenser lens 76, a trichromatic separation system (DM1, DM2), and a field lens 76R or 76G, or the relay lens group 76B placed immediately before the liquid crystal display device (RLCD, GLCD, or BLCD), whereby an optical conjugate relation is maintained between the light entrance plane or the principal plane of each lens unit forming the first lens array 73, and the liquid crystal display devices (i.e., the image on this plane of each unit lens is formed on the display devices), thereby realizing superimposed illumination in a rectangular shape matched with the shape of the liquid crystal display devices.

FIG. 10 showed the example of the illumination system using the lens arrays (73, 74), but there is also another illumination system with the rod integrator contemplated. Specifically, the light from the light source 71 is made incident as convergent light to the rod so as to form a light source image on the light entrance plane of the rod, and a plurality of secondary light source images (images of the light source) are formed from the light source image formed on the light entrance plane, by total reflection on the side surfaces of the rod integrator and by a lens unit placed thereafter. After that, the light from each of the secondary light source images is guided through the PBS element to effect polarization conversion thereof. Then the light travels via the condenser lens 76, the trichromatic separation system (DM1, DM2), and the field lens or the relay lens group placed immediately before each liquid crystal display device, whereby the aforementioned optical conjugate relation is maintained between the light exit plane of the rod integrator and the liquid crystal display devices, thereby realizing the superimposed illumination in the rectangular shape matched with the shape of the liquid crystal display devices.

In the illumination systems of the two types described above, where a cross dichroic prism 78 is used as a color composition system, the surfaces of the three-color liquid-crystal display devices, which are conjugate planes (i.e., planes in the optically conjugate relation, i.e., in the image forming relation) with a screen surface, need to be placed at nearly equal distance while being the length of the back focus of a projection lens 77 apart therefrom with the cross dichroic prism in between. At this time, only one out of the three color (R, G, B) beam paths having their respective wavelength zones different from each other is extended as illustrated in FIG. 10, when compared with the other two paths, and through the extended optical path the conjugate plane of the first lens array 73 or the light exit plane of the rod integrator is imaged on the liquid crystal display device, using the three relay lenses G1, G2, G3. This realizes the illumination effect equivalent to that by the two optical paths of the other colors.

However, since all the lenses G1, G2, G3 of the relay lens system 76B illustrated in FIG. 10 are positive lenses, the image (image plane) of the conjugate plane of the first lens array 73 is curved.

As the weight and size of the liquid crystal projectors have been reduced in recent years, the refracting power of each lens, particularly, in the relay lens system had to be increased and this tended to make the curvature of field greater.

When the image plane is curved, the image is blurred, particularly, only in peripheral portions (four corners) of the illumination area on the liquid crystal display devices, as illustrated in FIG. 11. This will cause nonuniformity of illuminance and thus result in color irregularity of the image projected onto the screen after composition of the three colors, which is not preferable.

SUMMARY OF THE INVENTION

An object of the present invention is, therefore, to provide an illumination apparatus and a projection apparatus without nonuniformity of illuminance in the illumination area or with acceptably little nonuniformity of illuminance if any.

An illumination apparatus according to one aspect of the present invention is an illumination apparatus for illuminating a surface to be illuminated, by use of light source means, secondary light source forming means for forming a plurality of secondary light sources from light emitted from the light source means, and a lens system for forming a conjugate plane conjugate with a light entrance plane or a vicinity plane thereof of the secondary light source forming means after a color separation system for separating light from the secondary light source forming means into three beams of mutually different wavelength regions, wherein a relay lens system is placed in a predetermined optical path out of three optical paths of the three beams color-separated and wherein the surface to be illuminated does not agree with a paraxial image plane of the conjugate plane formed by the relay lens system.

An illumination apparatus according to another aspect of the present invention is the illumination apparatus according to the above aspect wherein the surface to be illuminated, which does not agree with the paraxial image plane of said conjugate plane formed by said relay lens system, is located while being shifted to the light source side with respect to said paraxial image plane.

An illumination apparatus according to another aspect of the present invention is an illumination apparatus for illuminating a surface to be illuminated, by use of light source means, secondary light source forming means for forming a plurality of secondary light sources from light emitted from the light source means, and a lens system for forming a conjugate plane conjugate with a light entrance plane or a vicinity thereof of the secondary light source forming means after a color separation system for separating light from the secondary light source forming means into three beams of mutually different wavelength regions, wherein a relay lens system is placed in a predetermined optical path out of three optical paths of the three beams color-separated and wherein the surface to be illuminated lies at a position shifted from a position of a paraxial image plane to the center side of curvature of an image plane of the conjugate plane formed by the relay lens system.

An illumination apparatus according to another aspect of the present invention is the illumination apparatus according to either one of the above aspects wherein the lens system guides beams from said secondary light sources through a polarizing element for aligning directions of polarization thereof and thereafter guides the beams to said color separation system.

An illumination apparatus according to another aspect of the present invention is the illumination apparatus according to either one of the above aspects, which satisfies the following condition:

$$5.0 < OAL/L < 6.0$$

where OAL is a distance from a first lens unit closest to said light source means in said relay lens system, to the surface to be illuminated, and L is a length of a longitudinal cross section of said surface to be illuminated.

An illumination apparatus according to another aspect of the present invention is the illumination apparatus according to either one of the above aspects wherein said relay lens system comprises at least one aspherical lens.

An illumination apparatus according to another aspect of the present invention is the illumination apparatus according to either one of the above aspects, which satisfies the following condition:

$$IMD/L > 0.3$$

where IMD is an equivalent air distance from a final lens surface of said relay lens system to said surface to be illuminated, and L is a length of a longitudinal cross section of the surface to be illuminated.

An illumination apparatus according to another aspect of the present invention is the illumination apparatus according to either one of the above aspects wherein a position of an image of said light source means is located at infinity with respect to said surface to be illuminated.

An illumination apparatus according to another aspect of the present invention is the illumination apparatus according to either one of the above aspects, wherein said relay lens system comprises a first lens unit G1, a second lens unit G2 spaced through a large aerial gap from said first lens unit G1, and a third lens unit G3 in the stated order from the side of said light source means, said two lens units G1 and G3 of the relay lens system satisfying the following condition:

$$0.9 < PW1/PW3 < 1.3$$

where PW1 and PW3 are refracting powers of the first lens unit G1 and the third lens unit G3, respectively.

An illumination apparatus according to another aspect of the present invention is an illumination apparatus for illuminating a surface to be illuminated, by use of light source means, a rod integrator for taking in light from the light source means and emitting the light, and a lens system for forming a conjugate plane conjugate with a light exit plane or a vicinity plane thereof of the rod integrator after a color separation system for separating the light into three beams of mutually different wavelength regions, wherein a relay lens system is placed in a predetermined optical path out of three optical paths of the three beams color-separated, and wherein the surface to be illuminated does not agree with a paraxial image plane of the conjugate plane formed by the relay lens system.

An illumination apparatus according to another aspect of the present invention is the illumination apparatus according to the above aspect, which has the above rod integrator, wherein the surface to be illuminated, which does not agree with the paraxial image plane of said conjugate plane formed by the relay lens system, is located while being shifted to the light source side with respect to said paraxial image plane.

An illumination apparatus according to another aspect of the present invention is an illumination apparatus for illuminating a surface to be illuminated, by use of light source means, a rod integrator for taking in light from the light source means and emitting the light, and a lens system for forming a conjugate plane conjugate with a light exit plane or a vicinity plane thereof of the rod integrator after a color separation system for separating the light into three beams of mutually different wavelength regions, wherein a relay lens system is placed in a predetermined optical path out of three optical paths of the three beams color-separated, and wherein the surface to be illuminated lies (at a position shifted from a position of a paraxial image plane) on the center side of curvature of an image plane of the conjugate plane formed by the relay lens system.

An illumination apparatus according to another aspect of the present invention is the illumination apparatus according to either one of the above aspects wherein the lens system guides beams from said rod integrator through a polarizing element for aligning directions of polarization thereof and thereafter guides the beams to said color separation system.

An illumination apparatus according to another aspect of the present invention is the illumination apparatus according to either one of the above aspects, which satisfies the following condition:

$$5.0 < OAL/L < 6.0$$

where OAL is a distance from a first lens unit closes to said light source means in said relay lens system, to the surface to be illuminated, and L is a length of a longitudinal cross section of said surface to be illuminated.

An illumination apparatus according to another aspect of the present invention is the illumination apparatus according to either one of the above aspects, wherein said relay lens system comprises at least one aspherical lens.

An illumination apparatus according to another aspect of the present invention is the illumination apparatus according to either one of the above aspects, which satisfies the following condition:

$$IMD/L > 0.3$$

where IMD is an equivalent air distance from a final lens surface of said relay lens system to said surface to be illuminated, and L is a length of a longitudinal cross section of the surface to be illuminated.

An illumination apparatus according to another aspect of the present invention is the illumination apparatus according to either one of above aspects wherein a position of an image of said light source means is located at infinity with respect to said surface to be illuminated.

An illumination apparatus according to another aspect of the present invention is the illumination apparatus according to either one of above aspects wherein said relay lens system comprises a first lens unit G1, a second lens unit G2 spaced through a large aerial gap from said first lens unit G1, and a third lens unit G3 in the stated order from the side of said light source means, said two lens units G1 and G3 of the relay lens system satisfying the following condition:

$$0.9 < PW1/PW3 < 1.3$$

where PW1 and PW3 are refracting powers of the first lens unit G1 and the third lens unit G3, respectively.

An illumination apparatus according to another aspect of the present invention is an illumination apparatus for illuminating a surface to be illuminated, by use of light source means, secondary light source forming means for forming a plurality of secondary light sources from light emitted from the light source means, and a lens system for forming a conjugate plane conjugate with a light entrance plane or a vicinity plane thereof of the secondary light source forming means, wherein a relay lens system is placed in an optical path and wherein the surface to be illuminated does not agree with a paraxial image plane of the conjugate plane formed by the relay lens system.

An illumination apparatus according to another aspect of the present invention is an illumination apparatus for illuminating a surface to be illuminated, by use of light source means, secondary light source forming means for forming a plurality of secondary light sources from light emitted from the light source means, and a lens system for forming a conjugate plane conjugate with a light entrance plane or a vicinity plane thereof of the secondary light source forming means, wherein a relay lens system is placed in an optical path and wherein the surface to be illuminated is located at a position shifted from a position of a paraxial image plane to the center side of curvature of an image plane of the conjugate plane formed by the relay lens system.

An illumination apparatus according to another aspect of the present invention is an illumination apparatus for illuminating a surface to be illuminated, by use of light source means, a rod integrator for taking in light from the light source means and emitting the light, and a lens system for forming a conjugate plane conjugate with a light exit plane or a vicinity plane thereof of the rod integrator, wherein a relay lens system is placed in an optical path and wherein the surface to be illuminated does not agree with a paraxial image plane of the conjugate plane formed by the relay lens system.

An illumination apparatus according to another aspect of the present invention is an illumination apparatus for illuminating a surface to be illuminated, by use of light source means, a rod integrator for taking in light from the light source means and emitting the light, and a lens system for forming a conjugate plane conjugate with a light exit plane or a vicinity plane thereof of the rod integrator, wherein a relay lens system is placed in an optical path and wherein the surface to be illuminated is located at a position shifted from a position of a paraxial image plane to the center side of curvature of an image plane of the conjugate plane formed by the relay lens system.

An illumination apparatus according to another aspect of the present invention is the illumination apparatus according to the above aspect wherein the surface to be illuminated, which does not agree with the paraxial image plane of said conjugate plane of the exit plane of the rod integrator formed by said lens system, is located while being shifted to the light source side with respect to said paraxial image plane.

An illumination apparatus according to another aspect of the present invention is an illumination apparatus comprising:

a first optical system for forming a plurality of secondary light sources from light emitted from a light source; and a second optical system for illuminating a surface to be illuminated, with a plurality of beams from said plurality of secondary light sources, wherein said first optical system comprises an optical unit and/or a rod integrator, said optical unit comprising a first lens array placed on the light source side and a second lens array placed on the surface-to-be-illuminated side, wherein said second optical system projects onto said surface to be illuminated, an image of a light entrance plane of said first lens array or a light exit plane of said rod integrator, or a plane close to either one of said planes, and wherein said image is curved and a position of a paraxial (on-axis) portion of said curved image is shifted from a position of said surface to be illuminated.

An illumination apparatus according to another aspect of the present invention is the illumination apparatus according to the above aspect wherein said image is curved so that an off-axis portion thereof lies closer to said light source than said paraxial portion and wherein the position of said surface to be illuminated is shifted from the position of said paraxial portion toward the light source side.

A projection apparatus according to the present invention is a projection apparatus comprising a liquid crystal display device illuminated by the illumination apparatus as set forth in either one of the above aspects, and a projection optical system for projecting an image formed by said liquid crystal display device.

DETAILED DESCRIPTION OF THE PREFERRED EMBODIMENTS

Figure 1:
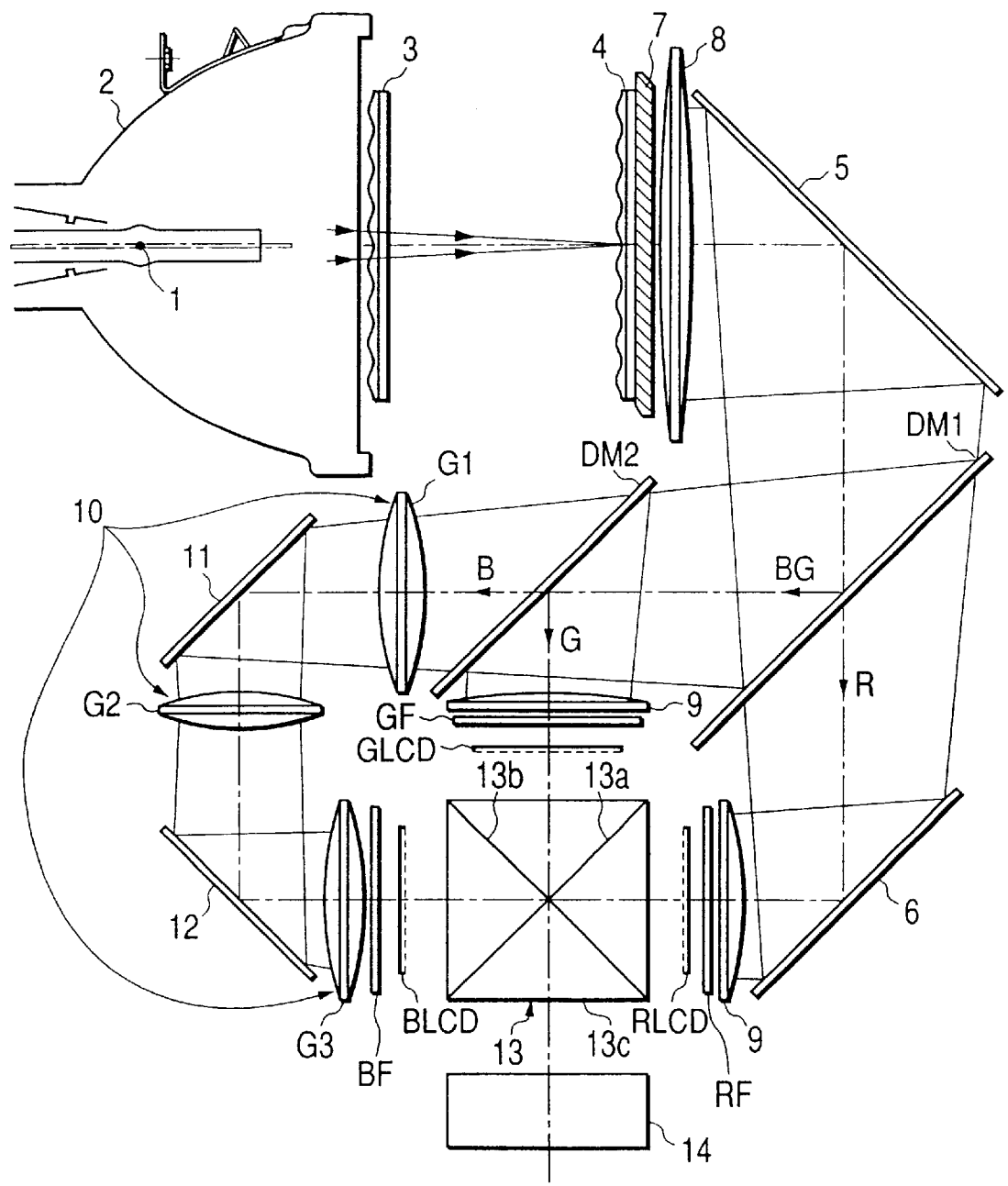
FIG. 1 is a schematic diagram of the major part of Embodiment 1 of the present invention.

FIG. 1 is a schematic diagram to show the major part of the projection apparatus according to Embodiment 1 of the present invention. FIG. 1 shows a color liquid crystal projector of the three panel type.

Figure 10:
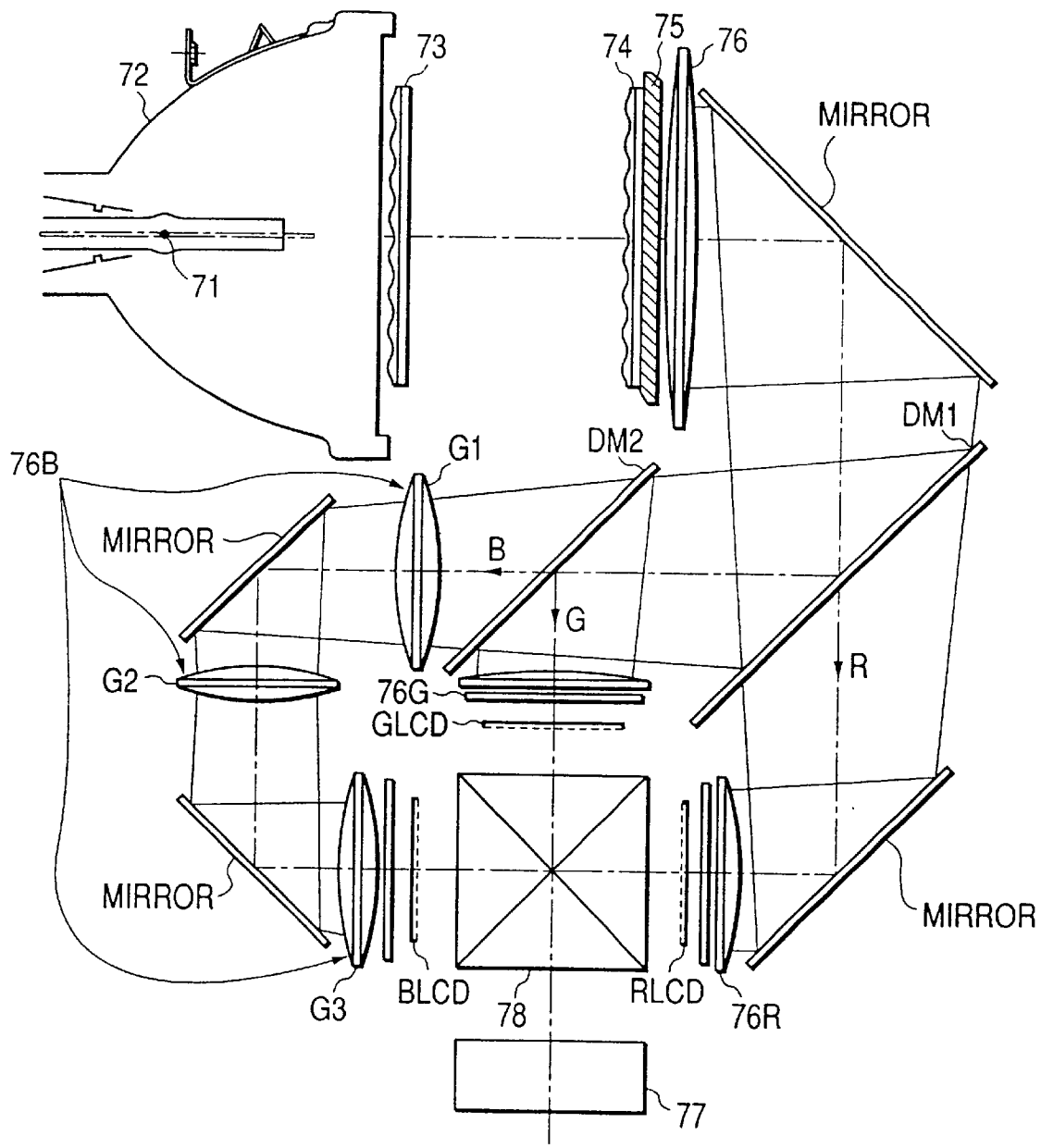
FIG. 10 is a schematic diagram to show the major part of the conventional liquid crystal projector of the three panel type.
Figure 11:
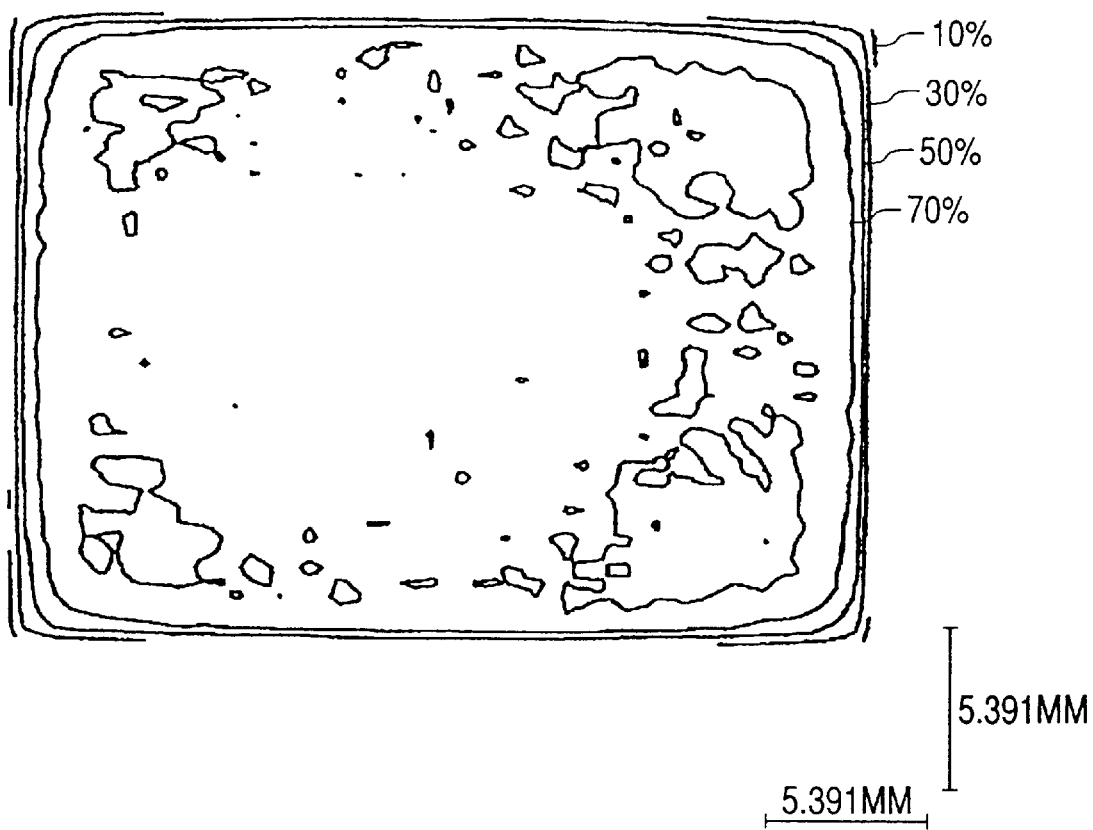
FIG. 11 is an explanatory diagram to show an illuminance distribution on an illuminated surface (liquid crystal panel) in the conventional liquid crystal projector of the three panel type.

The projection apparatus of FIG. 1 is identical in the basic structure with the projection apparatus of FIG. 10 but is greatly different in the structure of the relay lens system therefrom. The projection apparatus of FIG. 1 will be described in order with some redundancy in part of the description with FIG. 10.

In FIG. 1, reference numeral 1 designates a white light source such as a metal halide lamp or the like. Numeral 2 denotes a parabolic mirror as a reflector whose reflecting surface is a parabolic surface. The parabolic mirror 2 reflects the light from the light source 1 to convert it into parallel light and makes this parallel light incident to a first lens array 3. The first lens array 3 is a fly's eye lens plate having a plurality of lenses of a positive refracting power.

Numeral 4 represents a second lens array, which is a fly's eye lens plate having a plurality of lenses of a positive refracting power corresponding to the individual lenses of the first lens array 3. The first lens array 3 forms a plurality of secondary light source images on the second lens array 4.

Figure 2:
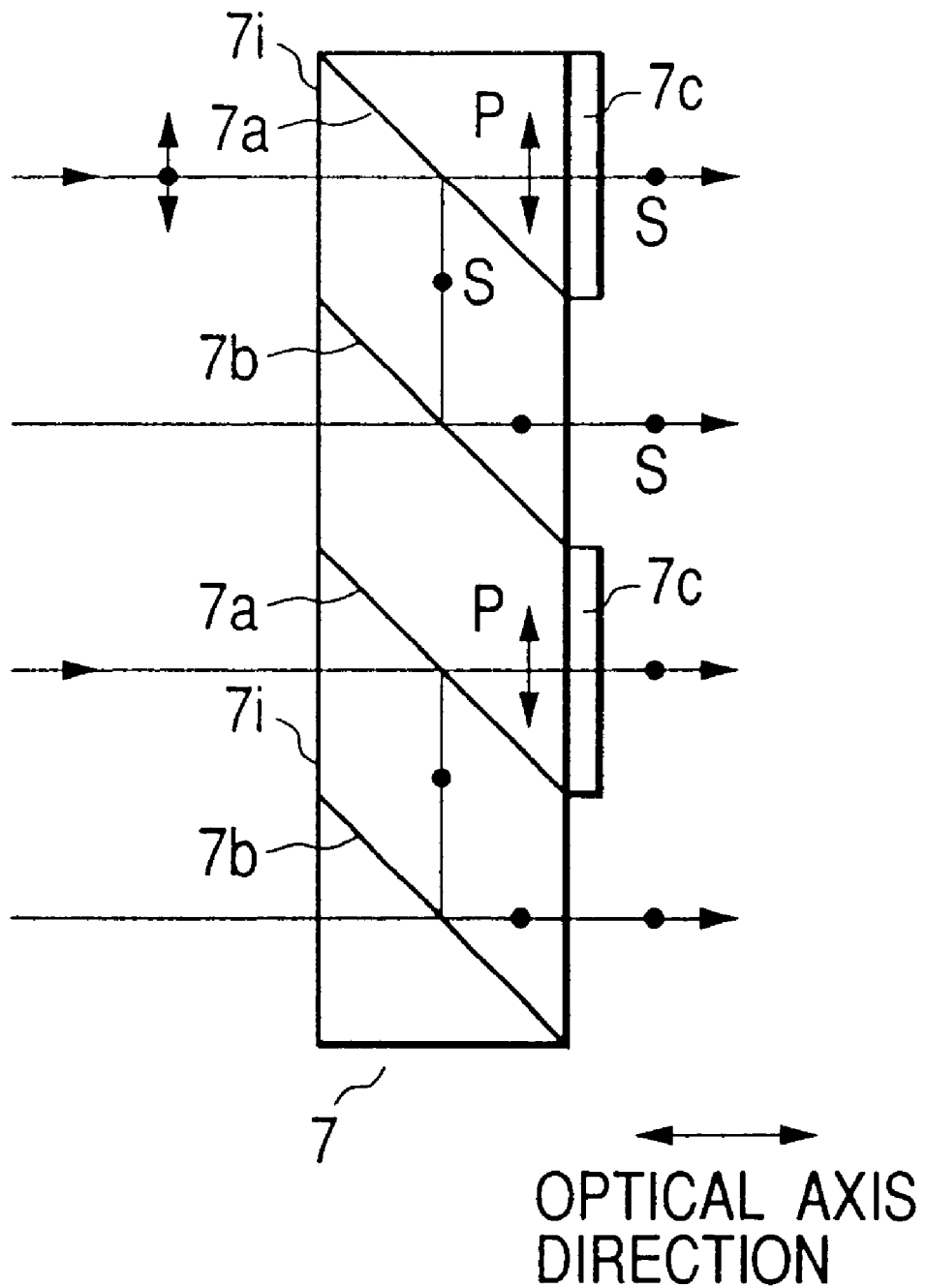
FIG. 2 is an explanatory diagram to show an enlarged view of a portion of FIG. 1.

Numeral 7 indicates a polarization conversion element array (PBS element), which has the structure illustrated in FIG. 2 and which converts non-polarized (or randomly polarized) light incident to each polarization conversion element into linearly polarized light having the plane of polarization along a specific direction and emerging from the array. Directions of polarization of the polarized light emerging from the respective polarization conversion elements agree with each other as illustrated in FIG. 2, and the outgoing polarized light is s-polarized light with respect to the reflecting surfaces of the dichroic mirrors DM1, DM2.

Numeral 8 stands for a condenser lens, which has a positive refracting power. Numeral 5 denotes a mirror.

DM1 represents a dichroic mirror that transmits light of red but reflects light of green and blue, and DM2 a dichroic mirror that transmits light of blue but reflects light of green. Numeral 6 represents a mirror.

Numeral 10 denotes a relay lens system, and FIG. 1 shows an example of the relay lens system consisting of three lens units G1, G2, G3. Each lens unit includes a lens or plural lenses.

Numerals 11 and 12 represent mirrors. RF is a red trimming filter, GF a green trimming filter, and BF a blue trimming filter.

RLCD designates a liquid crystal display device (LCD) for red only, GLCD that for green only, and BLCD that for blue only.

Numeral 13 denotes a cross dichroic prism as a color composition means, which has dichroic reflecting surfaces 13a, 13b inside and which effects composition of image beams of the respective colors from the three liquid crystal display devices RLCD, GLCD, BLCD to make a composite beam emerge from an exit surface 13c and enter an optical system 14.

Numeral 14 represents a projection lens, which enlarges and projects the composite image of the color images displayed on the liquid crystal display devices RLCD, GLCD, BLCD, resulting from the composition by the color composition means 13, onto the screen surface.

The structure of the polarization conversion element array 7 of FIG. 1 will be described referring to FIG. 2. The polarization conversion element array 7 is an array of polarization conversion elements corresponding to the individual lenses of the second lens array 4, and each element has a polarization separating surface 7a, a reflecting surface 7b which bends the optical path of s-polarized light reflected by the polarization separating surface 7a by 90°, and a half wave plate ($\lambda/2$ plate) 7c placed in an optical path of p-polarized light transmitted by the polarization separating surface 7a (or in an optical path of the s-polarized light reflected thereby). In FIG. 2 the $\lambda/2$ plates 7c are provided in the optical paths of the p-polarized light transmitted by the polarization separating surfaces 7a.

A beam incident to each polarization conversion element is separated into beams of the s-polarized light and p-polarized light (•, ⇆) having mutually orthogonal polarization directions by the polarization separating surface 7a, and the s-polarized light (•) reflected by the polarization separating surface 7a among them is reflected by the reflecting surface 7b. The p-polarized light is transmitted by the half wave plate 7c to be converted thereby into light (•) having the same polarization direction as the s-polarized light. Therefore, a plurality of beams of the s-polarized light having the same polarization direction emerge from the polarization conversion element array 7.

Part of the beams from the polarization conversion element array 7 travel through the condenser lens 8 and the field lens 9 to illuminate the liquid crystal display devices RLCD, GLCD in superimposed manner with a plurality of beams.

The other part travels through the condenser lens 8 and the relay lens system 10 to illuminate the liquid crystal display device BLCD in superimposed manner with a plurality of beams.

Figure 4:
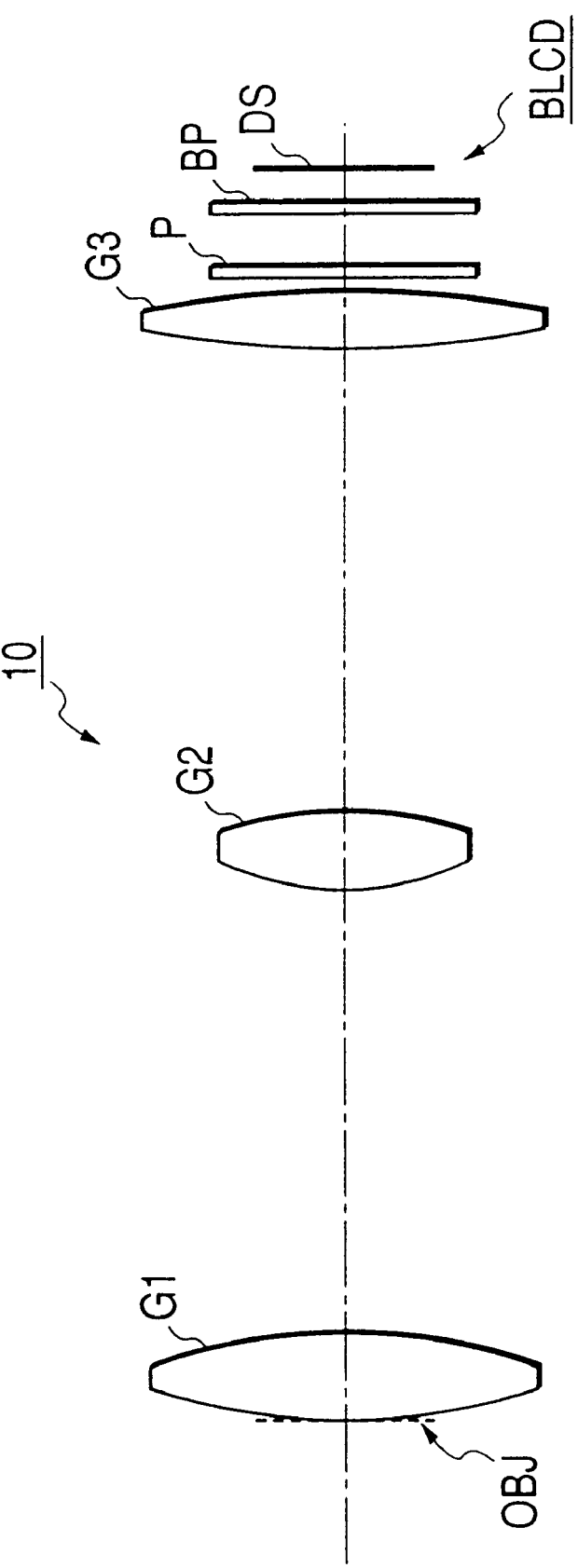
FIG. 4 is a lens cross-sectional view of Numerical Example 1 of the relay lens system according to the present invention.

In Embodiment 1, the relay lens system 10 consisting of at least three lens units having their respective positive refracting powers is placed in the optical path of blue light having the longer pathlength than the other two optical paths, out of the optical paths of the three beams, which are the three color beams of red, green, and blue separated by the dichroic mirrors DM1, DM2 after the condenser lens 8, and the light entrance surface of the blue liquid crystal display device BLCD does not agree with a paraxial image plane OBJ', which is formed by the relay lens system 10, of the conjugate plane OBJ of the first lens array 3, illustrated in FIG. 4, or the conjugate plane of the light exit plane of the rod integrator described hereinafter. The conjugate plane herein means the image plane.

This structure eliminates the image blur appearing only in the peripheral regions on the display panel surfaces and thus is free of an illuminance drop in the periphery relative to the center. Therefore, the blue liquid crystal display device BLCD can be illuminated in uniform illuminance distribution and color irregularity can be prevented from appearing in the color image on the screen.

The curvature of field caused by the relay lens system 10 is concave on the light source 1 side, so that peripheral image surfaces are tilted to the light source 1 side with respect to the aforementioned paraxial image plane. A reasonable consequence herein is thus to shift the liquid crystal display device BLCD from the position of the paraxial image plane to a position on the light source 1 side.

Let OAL be the distance from the lens unit G1 closest to the light source 1 in the relay lens system 10 to the liquid crystal display device BLCD, and L be the length of the longitudinal cross section of the liquid crystal display device BLCD. Then the apparatus is arranged to satisfy the following condition.

$$5.0 < OAL/L < 6.0 \quad (1)$$

Over the upper limit of above Condition (1) the liquid crystal projector set becomes large, which is not preferable. Under the lower limit the refracting powers of the respective lens units forming the relay lens system 10 become large, which makes correction for aberration difficult.

Particularly, if the refracting powers of the respective lens units are too large, the Petzval sum must be large, which will cause extremely large curvature of the image surface and make correction for distortion as described hereinafter difficult. For aberration correction, it is better to compose at least one lens in the relay lens system 10 of an aspherical lens.

Particularly, when an aspherical surface is adopted for the lens unit G2 in order to improve the basic imaging performance on the liquid crystal display device, spherical aberration can be corrected well in particular. When an aspherical surface is adopted for the lens unit G1 or for the lens unit G3, distortion can be corrected well and pupil matching can be made well with the projection lens, thereby increasing the utilization efficiency of light.

Concerning the relay lens system, let IMD be an equivalent air distance from the final surface of the relay lens system 10 to the surface of the liquid crystal display device BLCD with respect to the light outgoing from the conjugate plane OBJ of the first lens array 3 or from the conjugate plane of the light exit plane of the rod integrator, and L be the length of the longitudinal cross section of the liquid crystal display BLCD. Then the apparatus is arranged to satisfy the following condition.

$$IMD/L > 0.3 \quad (2)$$

Below the lower limit of above Condition (2) the back focus is too short as to the relay lens system 10 and there is thus little space for placement of the elements such as a polarizer and a filter, etc., which is not preferable.

In Embodiment 1, a modification thereof, and the other embodiments described hereinafter, the position of the image of the light source 1 is set at infinity with respect to the light entrance surface of each liquid crystal display device. This achieves good matching with the pupil position of the projection lens 14 and increases the light utilization efficiency. It is also necessary for realizing a good contrast on each liquid crystal display device. In the case of the illumination systems in which a microlens array as a means for enhancing luminance is mounted on the liquid crystal display device, this layout is preferable because sufficient telecentricity is essential.

The relay lens system 10 of the present embodiment has the lens unit G1, the lens unit G2 spaced through a large aerial gap from the lens unit G1, and the lens unit G3 in the stated order from the light source 1 side to the liquid crystal display device BLCD side, and the refracting powers of the lens unit G1 and the lens unit G3, PW1 and PW3 respectively, satisfy the following condition.

$$0.9 < PW1/PW3 < 1.3 \quad (3)$$

Deviation in either way from the range of above Condition (3) makes correction for distortion difficult and is thus not preferable. Particularly, above the upper limit the refracting power of the lens unit G1 becomes large and the image of the conjugate plane suffers pincushion distortion. Below the lower limit on the other hand, the image of the conjugate plane undergoes barrel distortion. In either case the light utilization efficiency decreases accordingly.

Figure 3:
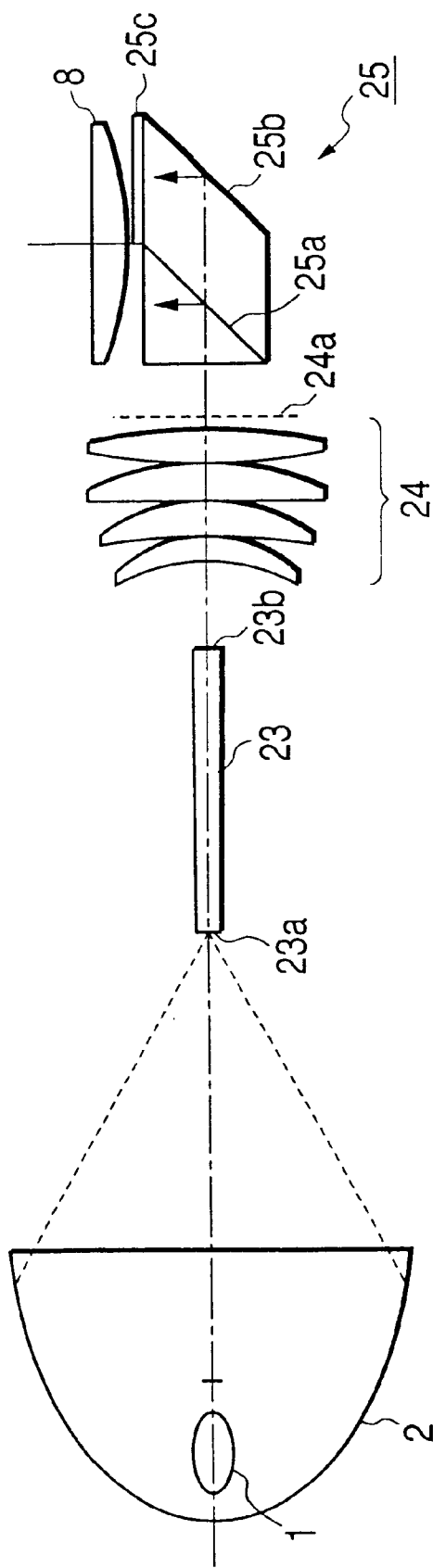
FIG. 3 is a diagram to show a modification of a portion of Embodiment 1 of the present invention.

FIG. 3 is a schematic diagram of the major part of a modification of the optical system from the light source 1 to the condenser lens 8 of above Embodiment 1.

In FIG. 3, reference numeral 1 designates a white light source as a light source, which is, for example, a metal halide lamp or the like.

Numeral 2 denotes a reflector, which is an ellipsoidal mirror and which collects beams emitted from the white light source located at the first focal point thereof, to form the image of the light source 1 at the second focal point thereof.

Numeral 23 represents a rod integrator (glass rod), the sectional shape of which is polygonal and the light entrance plane 23a of which is located at or near the second focal point of the reflector 2. Without having to be limited to the solid rod described herein, the integrator 23 can also be a hollow rod or kaleidoscope having internal reflecting surfaces.

The rod integrator 23 decreases luminance irregularity of the light source 1 and separates the light incident to the light entrance plane 23a into a plurality of beams substantially by a multiplicity of total reflections on the side surfaces to emit a plurality of beams from a plurality of light source images (virtual images) out of the light exit plane 23b.

Numeral 24 denotes a lens unit, which condenses the beams from the light exit plane 23b of the rod integrator 23 to form a plurality of secondary light source images 24a and which makes beams from the plurality of secondary light source images 24a incident to a polarization conversion element 25.

The polarization conversion element 25 has a polarization separating surface 25a for transmitting the p-polarized light out of the incident light but reflecting the s-polarized light, a reflecting surface 25b for reflecting the p-polarized light transmitted by the polarization separating surface 25a, and a half wave plate 25c placed in the optical path of the p-polarized light transmitted by the polarization separating surface 25a and reflected by the reflecting surface 25b (or in the optical path of the s-polarized light reflected by the separating surface 25a).

The lens unit 24 forms the plurality of secondary light source images 24a as images of the light source image formed on the light entrance plane 23a of the rod integrator 23. The polarization conversion element 25 converts non-polarized light incident thereto into beams having the polarization plane aligned in a predetermined polarization direction (s-polarization herein) and makes the beams incident to the condenser lens 8. The lens unit 24, the element 25, and the condenser lens 8 work to condense the plurality of beams from the light exit plane 23b of the rod integrator 23 and make them superimposed on the surfaces of the three liquid crystal display devices for the respective colors through the dichroic mirrors DM1, DM2 etc. illustrated in FIG. 1.

The first lens array 3 of FIG. 1 corresponds to the light exit plane 23b of the rod integrator 23 of FIG. 3 and the plurality of secondary light source images on the surface of the second lens array 4 of FIG. 1 to the plurality of secondary light source images 24a formed by the lens unit 24 of FIG. 3.

The following shows numerical examples of the relay lens system 10 used in each embodiment described above.

Figure 5:
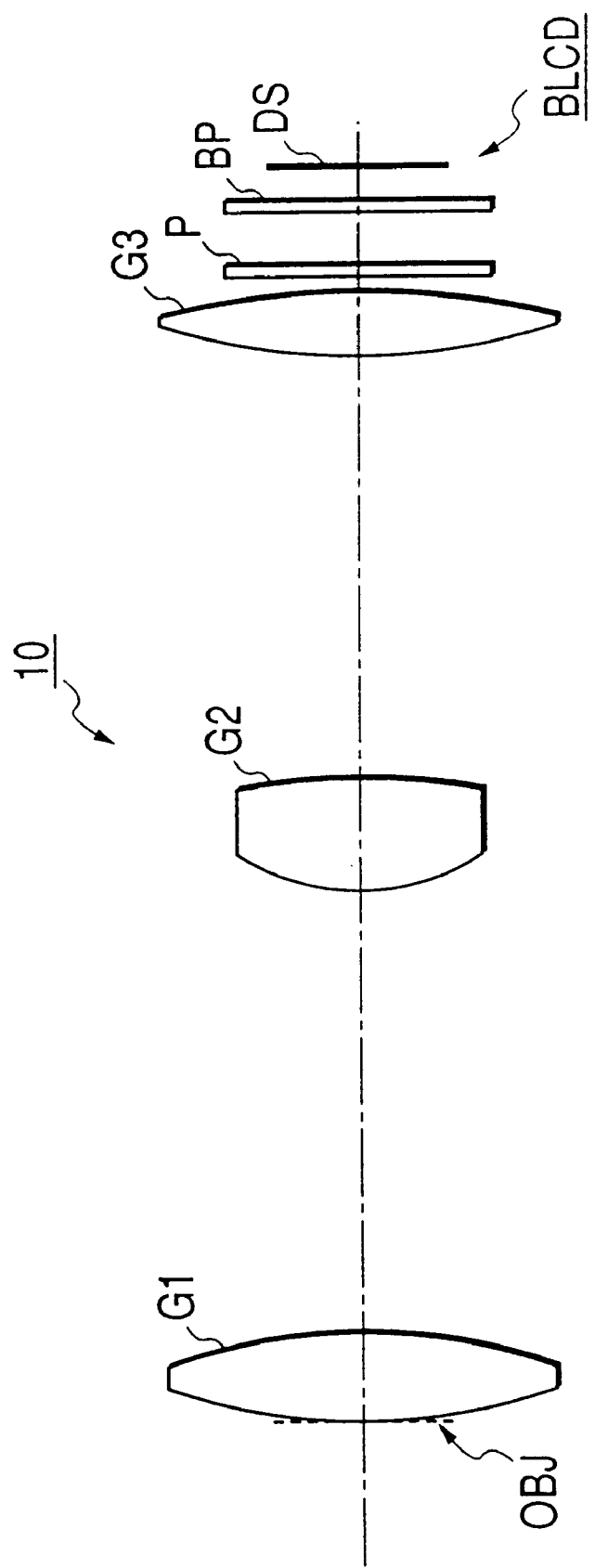
FIG. 5 is a lens cross-sectional view of Numerical Example 2 of the relay lens system according to the present invention.
Figure 6:
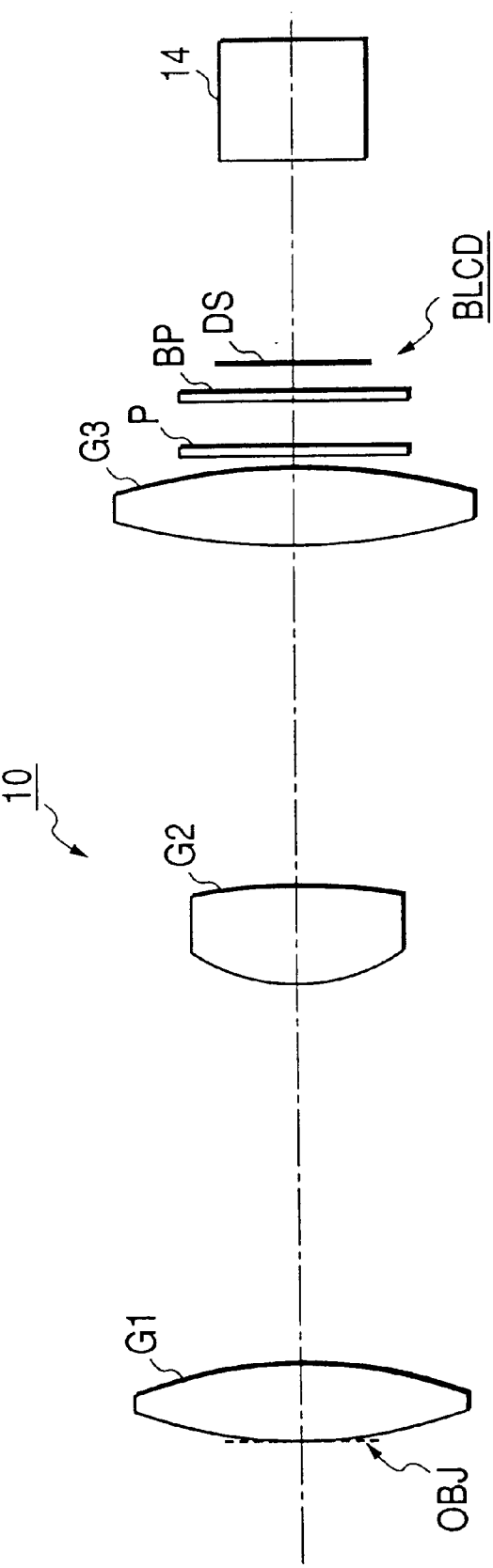
FIG. 6 is a lens cross-sectional view of Numerical Example 3 of the relay lens system according to the present invention.

FIG. 4 to FIG. 6 are lens sectional diagrams of Numerical Examples 1 to 3 of the relay lens system 10 used in the present invention. First, Numerical Example 1 of FIG. 4 will be described.

The relay lens system 10 of the present example is designed for the color liquid crystal projectors of the three panel type as illustrated in FIGS. 1 and 2. OBJ represents the conjugate plane of the first lens array 3 (first lens array conjugate plane) by the second lens array 4 and condenser lens 8, G1 the lens closest to the light source in the relay lens system, G2 the lens spaced through a large aerial gap from the lens G1, and G3 the lens located closest to the liquid crystal display. P indicates a polarizing glass sheet, BP a glass plate on the liquid crystal display device BLCD, and DS the display surface of the liquid crystal display device BLCD for blue.

The lens G1 functions to focus beams from a plurality of arc images (a plurality of secondary light source images) formed on the second lens array 4, on the pupil plane of the lens G2. The lens G2 functions to focus the beams from the first lens array conjugate plane OBJ, near the display surface of the liquid crystal display device BLCD to form a curved image of the conjugate plane OBJ there.

In the present example an aspherical surface is adopted for the surface G2b on the liquid crystal display device BLCD side of this lens G2, whereby spherical aberration is corrected for well on the image plane. The lens G3 functions to image the light source images (a plurality of arc images) formed on the pupil plane of the lens G2, on the pupil plane as a stop plane of the projection lens 14.

Each of the above lenses G1, G2, and G3 is coated with an antireflection coat in order to increase the light utilization efficiency. Increase in the Petzval sum due to the large refracting powers of the respective lenses is avoided by increasing the refractive index of the material for the lens G1 and the lens G3.

This relay lens system 10 has the pupil position set at infinity, which increases the light utilization efficiency and which permits the present illumination system to be also used in the liquid crystal display device equipped with the microlens array. The back focus of the relay lens system 10 is about 12 mm from the final surface of the lens G3 to the liquid crystal display device BLCD and the polarizing glass plate P is placed in this space.

It may also be contemplated that a dichroic filter as a trimming filter is evaporated on the back surface of the polarizing glass plate. This filter functions to cut an unwanted wavelength region incident to the liquid crystal display device, thereby greatly improving color purity in the single color.

Figure 7:
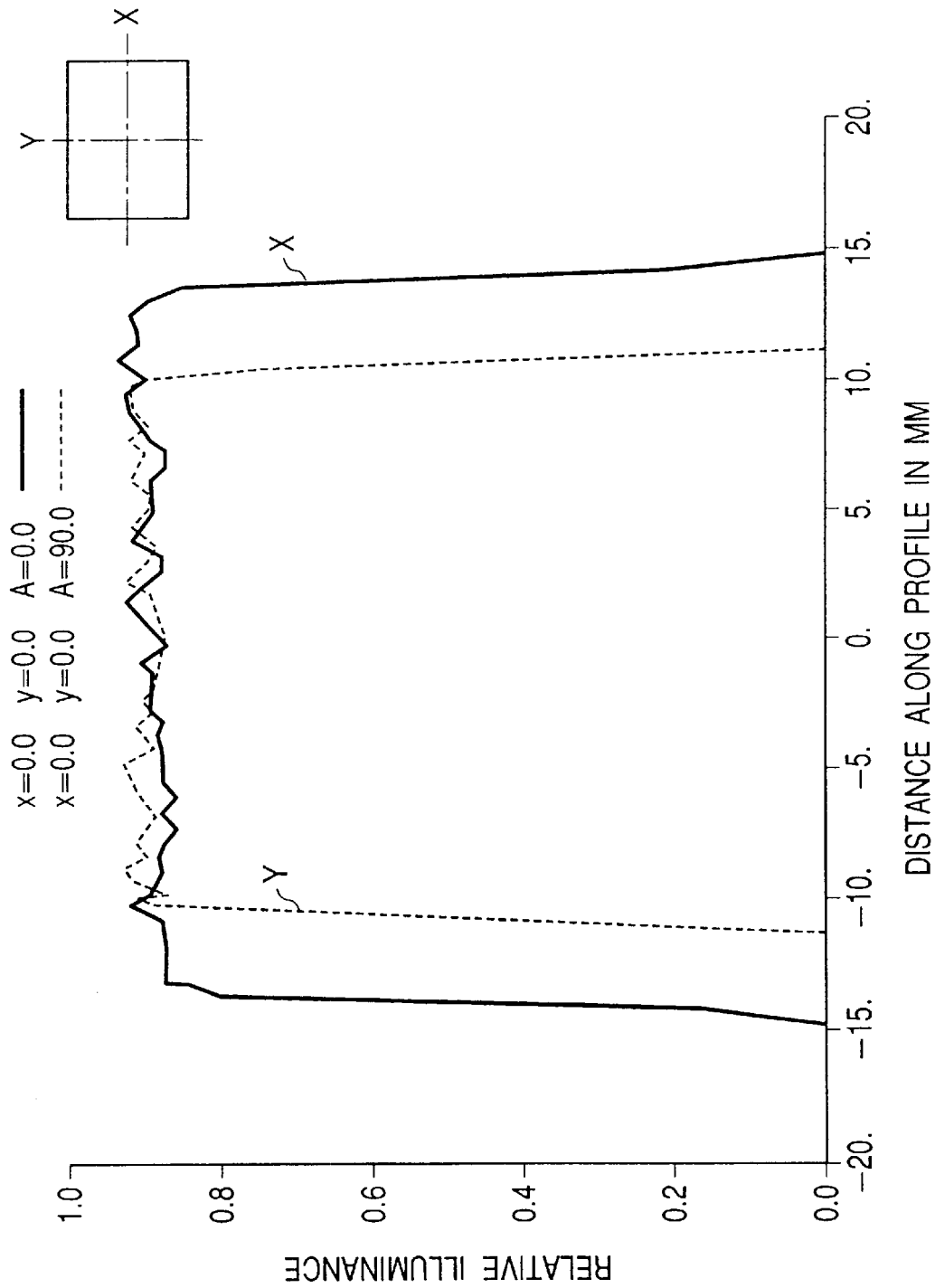
FIG. 7 is an explanatory diagram for explaining an illuminance profile on an illuminated surface in Example 1 of the present invention.

The present example can realize the highly uniform illumination as illustrated in FIG. 7, on the liquid crystal display device BLCD and suppress the color irregularity of the color image on the screen.

Next, FIG. 5 is a lens sectional diagram of Numerical Example 2 of the relay lens system 10.

The relay lens system 10 of the present example is designed for the color liquid crystal projectors of the three panel type as illustrated in FIGS. 1 and 2. OBJ represents the conjugate plane of the first lens array 3 by the second lens array 4 and condenser lens 8, G1 the lens closest to the light source in the relay lens system 10, G2 the lens spaced through a large aerial gap from the lens G1, and G3 the lens located closest to the liquid crystal display BLCD.

P indicates a polarizing glass sheet, BP a glass plate on the liquid crystal display device BLCD, and DS the display surface of the liquid crystal display device BLCD.

The lens G1 functions to focus the beams from the plurality of arc images (the plurality of secondary light source images) formed on the second lens array 4, on the pupil plane of the lens G2. The lens G2 functions to focus the beams from the first lens array conjugate plane OBJ, near the display surface of the liquid crystal display device BLCD to form a curved image of the conjugate plane OBJ there.

In the present example an aspherical surface is adopted for the surface on the liquid crystal display device BLCD side of this lens G2, whereby spherical aberration is corrected for well on the image plane. The lens G3 functions to image the light source images (the plurality of arc images) formed on the pupil plane of the lens G2, on the pupil plane as a stop plane of the projection lens 14.

Each of the above lenses G1, G2, and G3 is coated with an antireflection coat in order to increase the light utilization efficiency. Increase in the Petzval sum due to the large refracting powers of the respective lenses is avoided by increasing the refractive index of the material for the lens G1 and the lens G3. This relay lens system 10 has the pupil position set at infinity, which increases the light utilization efficiency and which permits the present illumination system to be also used in the liquid crystal display device equipped with the microlens array.

When the position of the light source images is set shorter than in the case of the present example, it is not preferable to apply the present illumination system, particularly, to the liquid crystal display device equipped with the microlens array. The back focus of the relay lens system 10 is about 10 mm from the final surface of the lens G3 to the liquid crystal display device BLCD and the polarizing glass plate P is placed in this space.

In the present example the back focus is slightly shorter than in Numerical Example 1 of FIG. 4 and thus the length between the lens G1 and the lens G3 can be set longer by that degree.

It may also be contemplated that a dichroic filter as a trimming filter is evaporated on the back surface of the polarizing glass plate P. This filter functions to cut an unwanted wavelength region incident to the liquid crystal display device, thereby greatly improving color purity in the single color.

Figure 8:
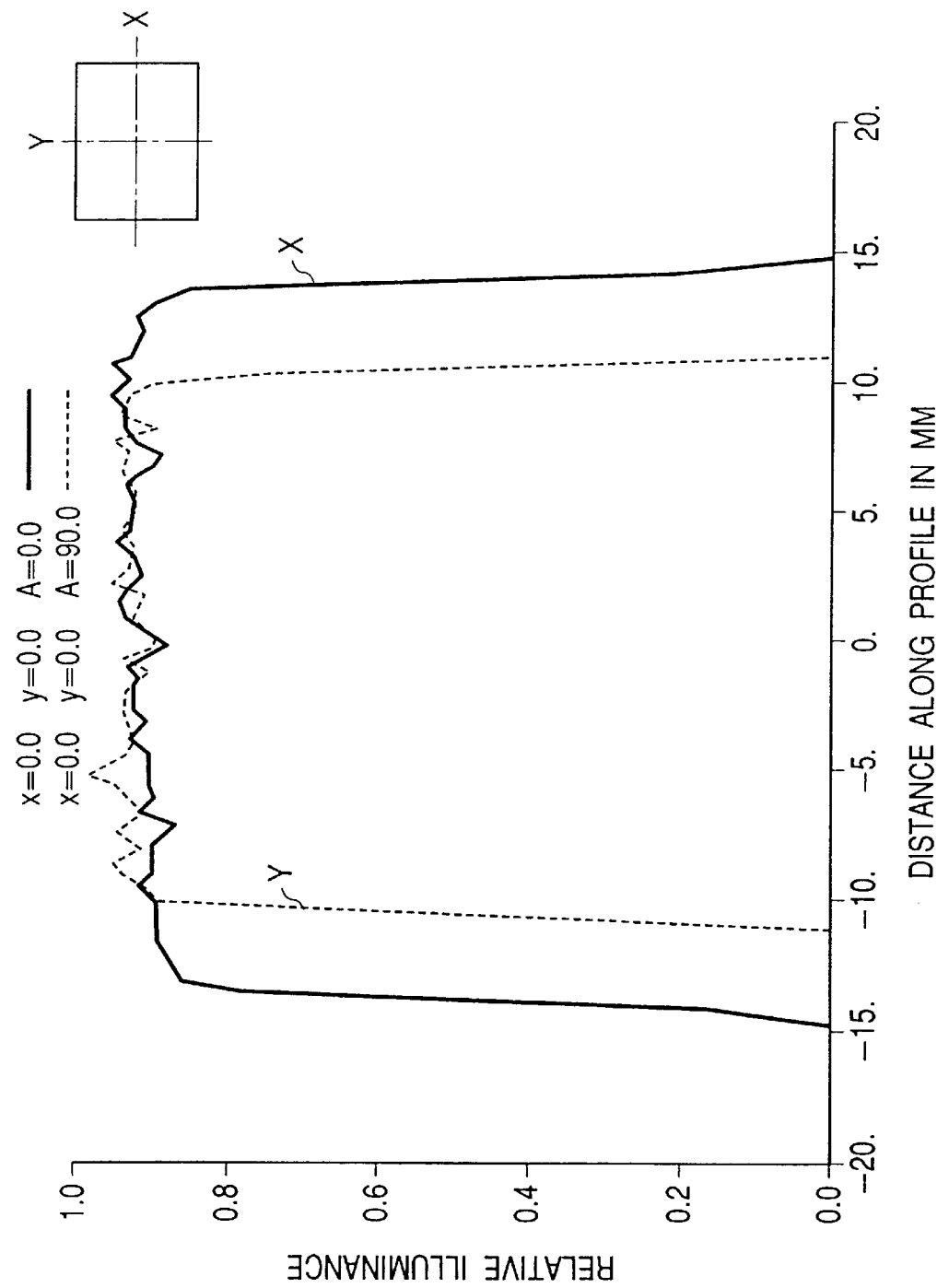
FIG. 8 is an explanatory diagram for explaining an illuminance profile on an illuminated surface in Example 2 of the present invention.

The present example can realize the highly uniform illumination as illustrated in FIG. 8, on the liquid crystal display device BLCD and greatly suppress the color irregularity of the color image on the screen.

FIG. 6 is a lens sectional diagram of Numerical Example 3 of the relay lens system 10.

Figure 9:
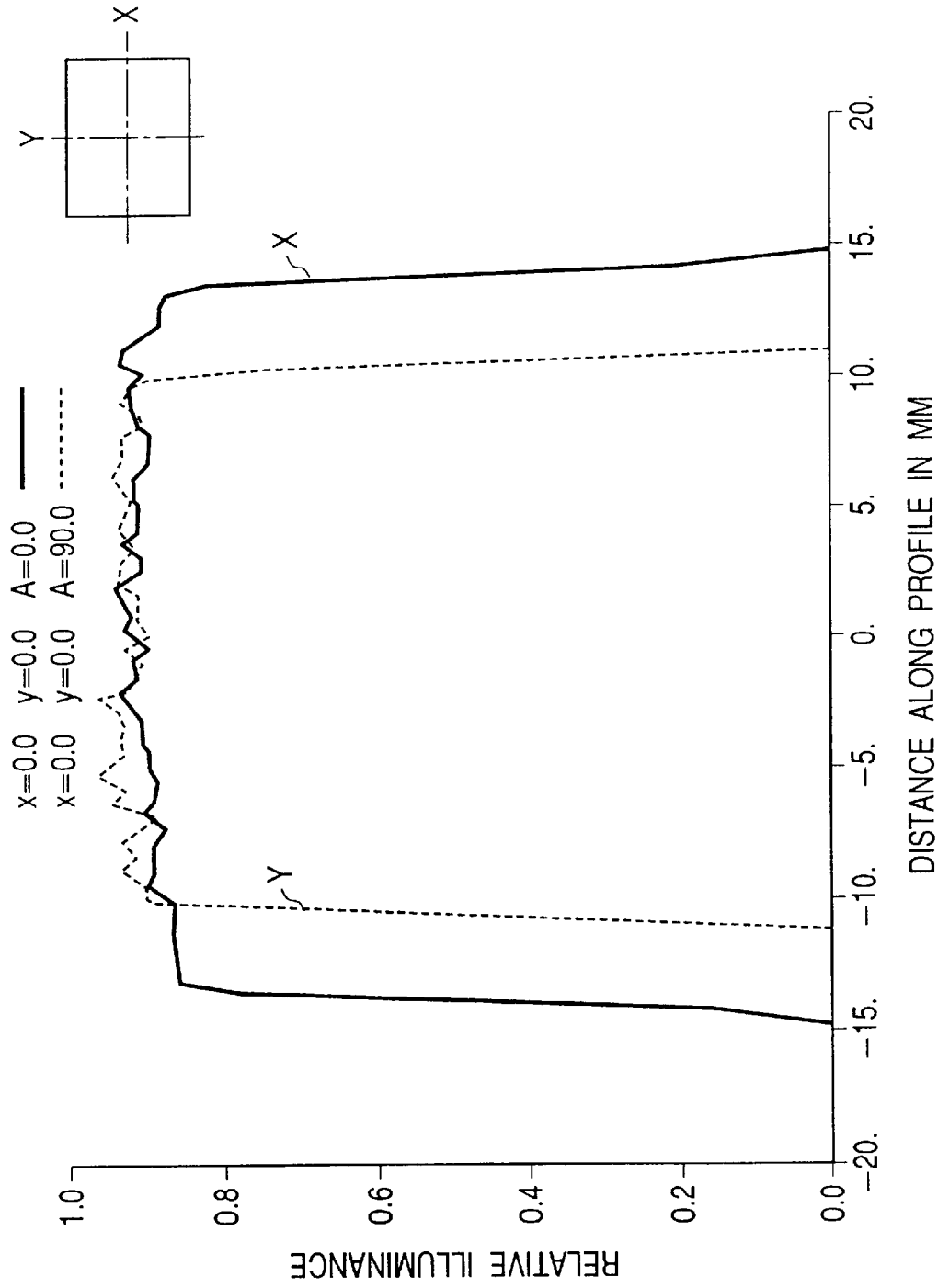
FIG. 9 is an explanatory diagram for explaining an illuminance profile on an illuminated surface in Example 3 of the present invention.

The basic structure of the relay lens system in the present numerical example is similar to that in Numerical Examples 1 and 2 of FIG. 4 and FIG. 5. Therefore, the detailed description is omitted herein. The present example can realize the highly uniform illumination as illustrated in FIG. 9, on the liquid crystal display device BLCD and suppress the color irregularity of the color image on the screen.

The present invention can also be applied to the liquid crystal projectors of a single panel type as it is. In such cases the optical path may be one including the relay lens system or one not including the relay lens system. The basic structure is similar to that in FIG. 1 to FIG. 3 or the like.

The lens data of above Numerical Examples 1, 2, and 3 is given below. In the data, ri represents the radius of curvature of a lens surface located at the ith position from the light source side, di the distance between the ith lens surface and the (i+1)th lens surface by the same counting method, ndi the refractive index at the d-line of the glass forming the ith lens, and vdi the Abbe number of the glass forming the ith lens by the same counting method.

The shape of the aspherical surfaces is expressed by the following equation where the X-axis is taken along the direction of the optical axis, the H-axis is taken along a direction perpendicular to the optical axis, the traveling direction of light is positive, R is the radius of paraxial curvature, and A, B, C, D, and E are aspherical coefficients.

$$X=(1/R)H^2/[1+\{1-(1+K)(H/R)^2\}^{1/2}]+AH^2+BH^4+CH^6+DH^8+EH^{10}$$

Further, "e−OX" means $10^{-X}$.

(Numerical Example 1)

|   | r | d | nd | vd |
|---|---|---|---|---|
| 1 | 64.816 | 9.00 | 1.723 | 37.9 |
| 2 | −64.816 | 48.63 | | |
| 3 | 29.728 | 8.60 | 1.491 | 57.1 |
| 4 | (−31.771) | 50.49 | | |
| 5 | 84.390 | 7.00 | 1.723 | 37.9 |
| 6 | −84.390 | 1.50 | | |
| 7 | inf. | 1.00 | 1.516 | 64.1 |
| 8 | inf. | 5.70 | | |
| 9 | inf. | 0.80 | 1.460 | 65.4 |
| 10 | inf. | | | |

|   | c(1/r) | k | A |
|---|---|---|---|
| 4 | −3.147e−02 | −7.588e−02 | 4.616e−05 |
|   | B | C | D |
|   | −6.082e−07 | 7.961e−09 | −3.441e−11 |
|   | E | | |
|   | 0.000e+00 | | |

(OAL/L)=(136.72/26.41)=5.1
IMD/L)=(12.41/26.41)=0.47
(PW1/PW3)=(0.0223/0.0174)=1.28

(Numerical Example 2)

|   | r | d | nd | vd |
|---|---|---|---|---|
| 1 | 67.176 | 10.00 | 1.723 | 37.9 |
| 2 | −67.176 | 47.49 | | |
| 3 | 21.460 | 12.00 | 1.491 | 57.1 |
| 4 | (−56.768) | 47.01 | | |
| 5 | 79.297 | 6.50 | 1.723 | 37.9 |
| 6 | −79.297 | 1.50 | | |
| 7 | inf. | 1.00 | 1.516 | 64.1 |
| 8 | inf | 5.70 | | |
| 9 | inf. | 0.80 | 1.460 | 65.4 |
| 10 | inf | | | |

|   | c(1/r) | k | A |
|---|---|---|---|
| 4 | −1.762e−02 | 1.574e+00 | 4.616e−05 |
|   | B | C | D |
|   | −6.082e−07 | 7.961e−09 | −3.441e−11 |
|   | E | | |
|   | 0.000e+00 | | |

(OAL/L)=(134.22/26.41)=5.08
(IMD/L)=(10.63/26.41)=0.40
(PW1/PW3)=(0.02153/0.01851)=1.16

(Numerical Example 3)

|   | r | d | nd | vd |
|---|---|---|---|---|
| 1 | 56.645 | 10.00 | 1.723 | 37.9 |
| 2 | −80.707 | 46.17 | | |
| 3 | 20.676 | 12.00 | 1.491 | 57.1 |
| 4 | (−69.891) | 44.83 | | |
| 5 | 76.224 | 10.00 | 1.723 | 37.9 |
| 6 | −76.224 | 1.50 | | |
| 7 | inf. | 1.00 | 1.516 | 64.1 |
| 8 | inf. | 5.70 | | |
| 9 | inf. | 0.80 | 1.460 | 65.4 |
| 10 | inf. | | | |

|   | c(1/r) | k | A |
|---|---|---|---|
| 4 | −1.431e−02 | 3.000e+00 | 4.616e−05 |
|   | B | C | D |
|   | −6.082e−07 | 7.961e−09 | −3.441e−11 |
|   | E | | |
|   | 0.000e+00 | | |

(OAL/L)=(136/26.41)=5.15
(IMD/L)=(12.41/26.41)=0.47
(PW1/PW3)=(0.02174/0.01905)=1.14

What is claimed is:

1. An illumination apparatus for illuminating a surface to be illuminated with a light beam from a light source means, said apparatus comprising:

secondary light source forming means for forming a plurality of secondary light sources using the light beam from the light source means;

a color separation system for color-separating light beams from the secondary light source forming means into three light beams having different wavelength regions from one another;

an optical system for forming, at a position closer to the surface to be illuminated than said color separation system, a conjugate plane conjugate to an incident surface of said secondary light source forming means or a plane in the vicinity thereof; and a relay optical system disposed in at least one optical path of the three light beams color-separated by said color separation system, wherein the conjugate plane conjugate to the incident surface of said secondary light source forming means or the plane in the vicinity thereof, formed on the optical path on which said relay optical system is disposed by means of said relay optical system is a curved plane, and a paraxial image plane of the conjugate plane formed by said relay optical system is located at a position shifted from the surface to be illuminated.

2. The illumination apparatus according to claim 1, wherein the surface to be illuminated is located at a position shifted toward a side toward which the conjugate plane is curved with respect to the position of the paraxial image plane of the conjugate plane formed by said relay optical system.

3. The illumination apparatus according to claim 1, wherein the relay optical system guides beams from said secondary light sources through a polarizing element for aligning directions of polarization thereof and thereafter guides the beams to said color separation system.

4. The illumination apparatus according to claim 1, wherein the surface to be illuminated is located at a position closer to the light source than the position of the paraxial image plane or the conjugate plane formed by said relay optical system.

5. The illumination apparatus according to claim 1, wherein said relay optical system includes a plurality of optical units and the following condition is satisfied, $$5.0 < OAL/L < 6.0$$

where OAL represents a distance from a first optical unit which is disposed at a position closest to the light source side among said plurality of optical units and the surface to be illuminated, and L represents a length of a longitudinal cross section of the surface to be illuminated.

6. The illumination apparatus according to claim 1, wherein said relay optical system has at least one aspherical surface.

7. The illumination apparatus according to claim 1, which satisfies the following condition:

$$IMD/L > 0.3$$

where IMD is an equivalent air distance from a surface of said relay optical system which is closest to the surface to be illuminated, and L is a length of a longitudinal cross section of the surface to be illuminated.

8. The illumination apparatus according to claim 1, wherein a position of an image of said light source means is located at infinity with respect to said surface to be illuminated.

9. The illumination apparatus according to claim 1, wherein said relay optical system includes a first optical unit, a second optical unit having relatively long air distance from the first optical unit, and a third optical unit in the order from said light source, and the following condition is satisfied:

$$0.9 < PW1/PW3 < 1.3$$

where PW1 represents a refractive power of said first optical unit and PW3 represents a refractive power of said third optical unit.

10. An apparatus comprising:
liquid crystal devices illuminated by the illumination apparatus according to claim 1, and a projection optical system for projecting images formed by said liquid crystal devices.

11. An illumination apparatus for illuminating a surface to be illuminated with a light beam from a light source means, said apparatus comprising:
a rod integrator which receives the light beam from the light source means and emits the light beam;
a color separation system for color-separating the light beam from said rod integrator into three light beams having different wavelength regions from one another;
an optical system for forming a conjugate plane conjugate to an exit surface of said rod integrator or a plane in the vicinity thereof at a position closer to the surface to be illuminated than said color separation system; and
a relay optical system disposed in at least one optical path of the three light beams color-separated by said color separation system;
wherein the conjugate plane conjugate to the exit surface of said rod integrator or the plane in the vicinity thereof, formed on the optical path on which said relay optical system is disposed by said relay optical system is a curved plane, and a paraxial image plane of the conjugate plane formed by said relay optical system is located at a position shifted from a position of the surface to be illuminated.

12. The illumination apparatus according to claim 11, wherein the surface to be illuminated is located at a position shifted toward a side toward which the conjugate plane is curved with respect to the position of the paraxial image plane of the conjugate plane formed by the relay optical system.

13. The illumination apparatus according to claim 11, wherein the relay optical system guides beams from said rod integrator through a polarizing element for aligning directions of polarization thereof and thereafter guides the beams to said color separation system.

14. The illumination apparatus according to claim 11, wherein the surface to be illuminated is located at a position closer to the light source means than the paraxial image plane of the conjugate plane formed by said relay optical system.

15. The illumination apparatus according to claim 11, wherein said relay optical system includes a plurality of optical units and the following condition is satisfied:

$$5.0 < OAL/L < 6.0$$

where OAL represents a distance from a first optical unit which is disposed at a position closest to the light source side among the plurality of optical units and the surface to be illuminated, and L represents a length of longitudinal cross section of the surface to be illuminated.

16. The illumination apparatus according to claim 11, wherein said relay optical system has at least one aspherical surface.

17. The illumination apparatus according to claim 11, which satisfies the following condition:

$$IMD/L > 0.3$$

where IMD is an equivalent air distance from a surface of said relay optical system which is closest to the surface to be illuminated, and L is a length of a longitudinal cross section of the surface to be illuminated.

18. The illumination apparatus according to claim 11, wherein a position of an image of said light source means is located at infinity with respect to said surface to be illuminated.

19. The illumination apparatus according to claim 11, wherein said relay optical system includes a first optical unit, a second optical unit having a relatively long air distance from the first optical unit and a third optical unit in the order from said light source means and the following condition is satisfied:

$$0.9 < PW1/PW3 < 1.3$$

where PW1 represents a refractive power of said first optical unit and PW3 represents a refractive power of said third optical.

20. A projection apparatus comprising:
liquid crystal devices illuminated by the illumination apparatus according to claim 11, and
a projection optical system for projecting images formed by said liquid crystal devices.

21. An illumination apparatus comprising:
a first optical system for forming a plurality of secondary light sources from light emitted from a light source; and
a second optical system for illuminating a surface to be illuminated, with a plurality of beams from said plurality of secondary light sources, wherein said first optical system comprises an optical unit and/or a rod integrator, said optical unit comprising a first lens array placed on the light source side and a second lens array placed on the surface-to-be-illuminated side, wherein said second optical system projects onto said surface to be illuminated, an image of a light entrance plane of said first lens array or a light exit plane of said rod integrator, or a plane close to either one of said planes, and wherein said image is curved and a position of a paraxial portion of said curved image is shifted from a position of said surface to be illuminated.

22. The illumination apparatus according to claim 21, wherein said image is curved so that an off-axis portion thereof lies closer to said light source than said paraxial portion and wherein the position of said surface to be illuminated is shifted from the position of said paraxial portion toward the light source side.

23. A projection apparatus comprising:
liquid crystal devices illuminated by the illumination apparatus according to claim 21, and
a projection optical system for projecting images formed by said liquid crystal devices.

24. An illumination apparatus for illuminating a surface to be illuminated with a light beam from a light source means, said apparatus comprising:
a rod integrator which receives the light beam from said light source means and emits the light beam, and
an optical system for illuminating the surface to be illuminated with the light beam from said rod integrator, said optical system forming an image of exit surface of said rod integrator at a position near the surface to be illuminated,
wherein said image is a curved image, and a position of paraxial image plane of said image is shifted from a position of the surface to be illuminated.

25. An apparatus according to claim 24, wherein the surface to be illuminated is located at a position shifted from the position of the paraxial image plane of said image toward a side toward which said image is curved.

26. An apparatus according to claim 24, wherein said image is concave toward the light source side.

27. An apparatus according to claim 24, wherein the surface to be illuminated is located at a position closer to the light source means than the position of the paraxial image plane of said image.

28. A projection apparatus comprising:
liquid crystal devices illuminated by the illumination apparatus according to claim 24; and
a projection optical system for projecting images formed by said liquid crystal devices.

29. An illumination apparatus for illuminating a surface to be illuminated with a light beam from a light source means, said apparatus comprising:
secondary light source forming means for forming a plurality of secondary light source using the light beam from said light source means; and
an optical system for illuminating the surface to be illuminated with the light beams from said plurality of secondary light sources, said optical system forming an image of an incident surface of said secondary light source forming means at a position near the surface to be illuminated,
wherein said image is a curved image and a position of paraxial image plane of said image is shifted from a position of the surface to be illuminated.

30. An apparatus according to claim 29, wherein the surface to be illuminated is located at a position shifted from the position of the paraxial image plane of the image toward a side toward which the image is curved.

31. An apparatus according to claim 29, wherein said image is concave toward the light source side.

32. An apparatus according to claim 29, wherein the surface to be illuminated is located at a position closer to the light source means than the position of the paraxial image plane of said image.

33. A projection apparatus comprising:
liquid crystal devices illuminated by the illumination apparatus according to claim 29; and
a projection optical system for projecting images formed by said liquid crystal devices.

34. An illumination apparatus for illuminating a surface to be illuminated with a light beam from light source means, said apparatus comprising:
secondary light source forming means for forming a plurality of light sources using the light beam from said light source means, and
an optical system for illuminating the surface to be illuminated with the light beams from said plurality of secondary lights sources, said optical system forming an image of an incident surface of said secondary light source forming means or an image of a plane in the vicinity thereof,
wherein said image is curved so that an off-axis position of said image is substantially coincident with the position of the surface to be illuminated.

35. The illumination apparatus according to claim 34, wherein said image is concave toward the light source means side.

36. A projection apparatus comprising:
liquid crystal display devices illuminated by said illumination apparatus according to claim 34; and
a projection optical system for projecting images formed by said liquid crystal display devices.

37. An illumination apparatus for illuminating a surface to be illuminated with a light beam from light source means, said apparatus comprising:
a rod integrator which receives the light beam from said light source means and emits the light beam;
an optical system for illuminating the surface to illuminated with the light beam from said rod integrator, said optical system forming an image of an exit surface of said rod integrator or an image of a plane in the vicinity thereof,
wherein said image is curved so that an off-axis position of said image is substantially coincident with the position of the surface to be illuminated.

38. The illumination apparatus according to claim 37, wherein said image is concave toward the light source means side.

39. A projection apparatus comprising:
liquid crystal display devices illuminated by said illumination apparatus according
to claim 37, and
a projection optical system for projecting images formed by said liquid crystal display devices.

* * * * *

UNITED STATES PATENT AND TRADEMARK OFFICE
CERTIFICATE OF CORRECTION

PATENT NO.     : 6,478,430 B2
DATED          : November 12, 2002
INVENTOR(S)    : Ken Wada It is certified that error appears in the above-identified patent and that said Letters Patent is hereby corrected as shown below:

Column 8,
Line 27, "← →" should read -- ↔ --
Line 32, " the,half" should read -- the half --

Column 14,
Line 32, "secondary light source" should read -- a secondary light source --

Column 17,
Line 28, "beam," should read -- beams, --
Line 56, "light source" should read -- light sources --

Column 18,
Lines 48-49, "to illuminated" should read -- to be illuminated --

Signed and Sealed this

Eighth Day of April, 2003

JAMES E. ROGAN
*Director of the United States Patent and Trademark Office*